Nov. 30, 1937.  A. J. WAYMAN  2,100,824
ELECTRIC CABLE CONNECTER
Filed Dec. 30, 1935

Inventor
Albert J. Wayman
By Frease and Bishop
Attorneys

Patented Nov. 30, 1937

2,100,824

UNITED STATES PATENT OFFICE 2,100,824

ELECTRIC CABLE CONNECTER

Albert J. Wayman, Youngstown, Ohio, assignor of one-half to Ernest H. McClure, East Palestine, Ohio Application December 30, 1935, Serial No. 56,597

4 Claims. (Cl. 247—18)

The invention relates to connecters providing a tight joint between electric cables and meter and terminal boxes usually located on the outside of buildings. More particularly, the invention relates to a connecter construction providing a water tight joint between an electric cable and a meter box, which construction prevents current theft.

Prior connecter constructions have included passing the cable through a rubber bushing or packing gland in a coupling sleeve to provide a waterproof seal, a clamping nut forcing the rubber bushing against the packing, and a thin tin washer between the bushing and nut to protect the rubber bushing.

In these prior constructions, the tin washer has a tendency to turn with the clamping nut and cut into the insulation of the cable, and the rubber bushing deteriorates rapidly in changing weather conditions to destroy the effectiveness of the seal and allow moisture to seep through the connecter.

Moreover, such a construction does not prevent current theft, because the clamping nut can be loosened and the rubber bushing removed, whereupon an unauthorized person can thrust a wire through the connecter and hook onto a meter terminal for the purpose of using current and cutting out the meter.

Accordingly, it is an object of the present invention to provide an improved watertight and theft proof connecter for an electric cable at its entrance to a meter box and the like.

Another object is to provide an improved connecter which does not require any parts of rubber or any other material which will deteriorate under changing weather conditions.

Another object is to provide an improved connecter construction in which removal of the cover does not expose any parts which may be removed to gain access to the meter through the connecter.

Another object is to provide an improved connecter construction having a metallic partition wall below the sealing means preventing access to the meter through the connecter.

A still further object is to provide an improved connecter construction adapted for being screwed in a meter box and the like, and having means for preventing unscrewing from the box by an unauthorized person.

And finally, it is an object of the present invention to provide a simple and inexpensive connecter construction embodying all of the foregoing objectives, which construction is easily installed or removed by an authorized person.

These and other objects are accomplished by the improvements comprising the present invention, which may be stated in general terms as including a connecter for screwing in a meter box and providing space for a plastic adhesive composition around the cable passing therethrough, a partition wall backing up the plastic and having separate apertures for the several conductors of the cable, and a cover for compressing the plastic.

In the drawing forming part hereof:

Similar numerals refer to similar parts throughout the drawing.

In connection with the modern trend toward placing electric meters on the outside of buildings, the connection between the cable enclosing the electrical conductors and the meter box involves serious difficulties, because the cable is usually in a vertical position and the connection with the meter box must be waterproof and weatherproof over long periods of time.

Moreover, much trouble has been experienced as the result of unauthorized persons stealing current by inserting a wire through the connecter and hooking onto a terminal of the meter, thereby by-passing the current around the meter.

Figure 1:
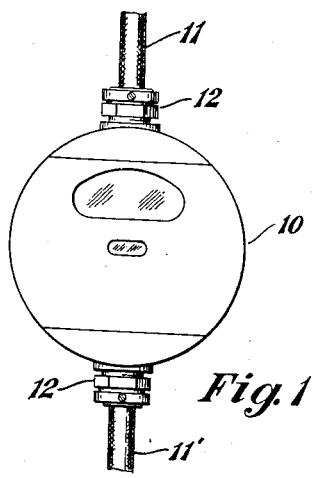
Figure 1 is a general view on a reduced scale, of my invention as applied to an ordinary electric meter box installation.

In Fig. 1 an ordinary type of electric meter is shown more or less diagrammatically at 10 and may be suitably mounted on the outside of a building wall. A cable 11 carrying the electrical conductors to the meter from the supply line is connected to the top of the meter by means of one of the improved connecters indicated generally at 12. A similar cable 11' is connected to the bottom of the meter 10 by means of one of the improved connecters 12, and the cable 11' preferably leads to an entrance box located inside of the building.

Figure 2:
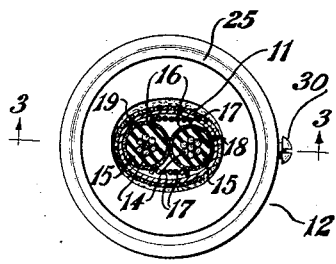
Fig. 2 is a plan view of the improved connecter showing the cable in cross section.

As best shown in Fig. 2, the cable 11 is of a well known construction generally elliptical in cross section, and includes wire conductors 14 each imbedded in rubber insulation 15 having a woven fabric cover 16. The so-called neutral conductor is formed by a series of wires 17 located outside of the insulated conductors 14, and a protective armor 18 in the form of a thin metallic strip is wrapped around the wires 17 and the fabric covers 16 of the insulated conductors 14. The armor 18 is preferably covered with a woven fabric or other insulating covering 19.

The construction of the cable 11 as above described is according to well known standard practice, and forms no part of the present invention.

The improved connecter 12 is preferably of malleable iron and includes a sleeve member 20 which is adapted at one end 21 to be screwed into an internally threaded socket 22 on the meter box. The sleeve may be provided with the external hexagonal portion 20a for engagement with a wrench to facilitate screwing the sleeve into and out of the meter box.

The sleeve 20 is adapted to encircle the cable 11 and is of sufficient diameter to provide ample space within the sleeve around the cable for the reception of a plastic sealing material indicated at 23.

A partition wall 24 is formed within the sleeve 20 preferably integral therewith and at or near the end 21 thereof, and a cap or cover 25 is provided at the other end of the sleeve for detachable connection therewith.

The underside of the cap 25 is preferably provided with an annular groove 26 which is adapted to fit over the tapered upper end 27 of the sleeve 20. At the inside of the groove 26, the cap 25 is preferably provided with a depending annular portion 28 which is adapted to compress the plastic sealing material 23 against the partition wall 24 and the sides of the cable and sleeve when the cover is secured to the upper end of the sleeve 20.

The means for securing the cover 25 to the upper end of the sleeve may comprise a set screw 30 screwed through the outer annular wall 31 of the cover and abutting the upper end 27 of the sleeve.

Obviously, the cover 25 may be detachably connected to the sleeve 20 by means of interengaging screw threads, or in some other well known manner.

Figure 5:
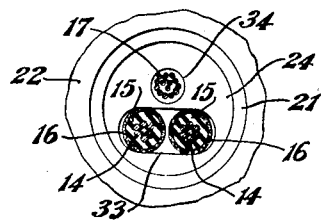
Fig. 5 is a fragmentary bottom plan view thereof.

As best shown in Fig. 5, the partition wall 24 is provided with separate apertures through which the several conductors of the cable 11 may pass. As shown, an elongated aperture 33 is provided for the insulated conductors 14, and a circular aperture 34 is provided for the neutral wires 17.

In installing the connecter around the electric cable 11 at its entrance to the meter box 10, the outer fabric covering 19 and metallic armor 18 is removed from the lower part of the cable up to a position which will be substantially intermediate the ends of the connecter sleeve 20. The neutral wires 17 are braided together as shown at 35, and passed through the aperture 34, while the two insulated conductors 14 are passed through the aperture 33.

The annular space between the conductors and cable and the sleeve 20 is then filled with a plastic adhesive weatherproof sealing material having a high dielectric strength. I prefer to use the plastic adhesive sealing material known commercially as "Duxseal", because of its high dielectric strength, its insolubility in water, its resistance to all weather conditions and its plastic adhesive character.

After the plastic sealing material 23 has been introduced within the sleeve and around the cable, the cap 25 is forced downwardly over the upper end 27 of the sleeve, and secured thereto by the set screw 30, the depending portion 28 thereby compressing the plastic material 23 downwardly against the partition wall 24, inwardly into adhesive contact with the cable 11 and the conductors thereof, and outwardly against the inside wall of the sleeve 20.

Preferably, an annular groove 36 is formed inside of the sleeve for providing excess space for the reception of the plastic material in the event a larger cable is used, and the groove 36 also provides a shoulder upon which a split metal washer and the like may be seated for a purpose to be described.

When thus assembled, the improved connecter 20 provides a watertight joint, because the sealing material 23 is compressed and made to adhere tightly to the sides of the cable and the inside of the sleeve 20. Moreover, the sealing material is not affected by weather conditions but provides a watertight seal over extremely long periods of time.

The partition wall 24 prevents theft of current in the event the cap 25 is removed by an unauthorized person attempting to thrust a wire through the connecter into the meter. If desired additional protection against theft may be provided by placing a split ring metal washer on the shoulder provided by groove 36.

By passing the several conductors 14 and 35 through the separate apertures 33 and 34 in the partition wall, any possibility of current theft is prevented by an unauthorized person unscrewing the sleeve 20 from the meter box socket 22, because when the conductors are connected to the terminals of the meter, the engagement of the conductors with the apertures 33 and 34 locks the sleeve 20 against any substantial turning.

Figure 6:
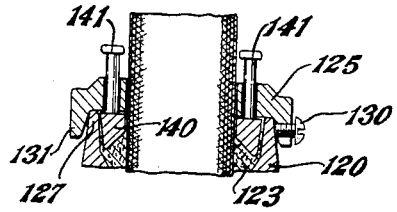
Fig. 6 is a fragmentary view similar to Fig. 3 of a slightly modified form of connecter.
Figure 3:
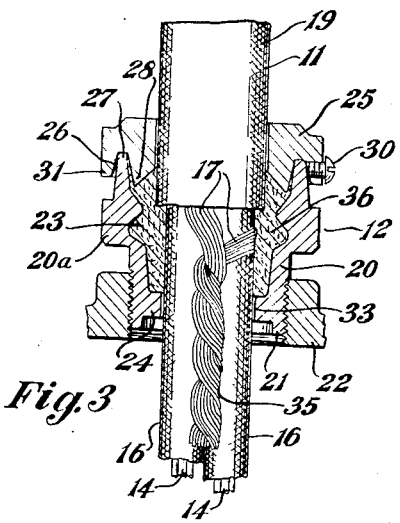
Fig. 3 is a fragmentary transverse sectional view as on line 3—3, Fig. 2.
Figure 4:
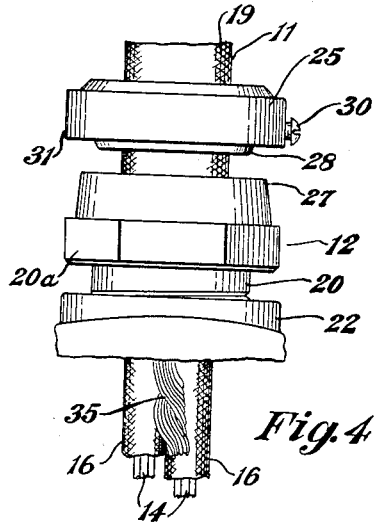
Fig. 4 is a similar view in elevation with the cover partly removed therefrom.

The modified form shown in Fig. 6 is the same in all respects as that shown in Fig. 3, except for the cover or cap. In Fig. 6 the cap 125 is provided with a depending outer flange 131 fitting around the tapered upper end 127 of the sleeve 120, and detachably connected thereto by the set screw 130.

A separate annular member 140 fits under the cap within the upper end of the sleeve for compressing the sealing material 123, and the member 140 preferably has headed pins 141 extending slidably through the cap 125. The function of the pins 141 is to indicate to an electrician or repairman whether there is a sufficient quantity of sealing material within the connecter, without having to remove the cap.

The improved connecter provides a watertight and theft proof joint, and is a simple and inexpensive construction easily installed and removed by an authorized person.

I claim:

1. Cable connecter construction including an integral sleeve having a screw-thread thereon at one end for screwing into a threaded socket, an integral partition wall in said sleeve member, a cable passing through said sleeve member and said partition wall, plastic adhesive weatherproof sealing material located between said sleeve and said cable, a cap member around the cable detachably secured to the other end of said sleeve for compressing said sealing material against said partition wall and cable, said partition wall having separate apertures through which the several conductors of said cable pass whereby said conductors lock said sleeve against removal from its socket.

2. A connecter for an electric cable comprising a sleeve for surrounding said cable and having a screw-thread formed on one end thereof, an integral partition wall closing the threaded end of said sleeve and provided with a plurality of conductor apertures formed therein, said conductor apertures being spaced apart whereby when conductors are arranged therein said conductors lock said sleeve against removal from its socket, a detachable cap element arranged to close the other end of said sleeve and provided with a single aperture for receiving said cable, said sleeve having an internal diameter larger than the aperture in said cap, whereby said sleeve provides an annular space surrounding said cable for receiving sealing compound, said cap being provided with an annular groove formed on the inner face thereof for receiving the end of said sleeve, whereby a portion of said cap lying within said annular groove extends into the end of said sleeve and serves to compress the sealing compound into contact with the cable and with the inner surfaces of said sleeve.

3. A connecter for an electric cable comprising a sleeve for surrounding said cable and having a screw-thread formed thereon for mounting said sleeve in a threaded socket, an integral partition wall closing one end of said sleeve and provided with a plurality of conductor apertures formed therein, said conductor apertures being spaced apart whereby when conductors are arranged therein said conductors lock said sleeve against removal from its socket, a detachable cap element arranged to close the other end of said sleeve and provided with a single aperture for receiving said cable, said sleeve having an internal diameter larger than the aperture in said cap, whereby said sleeve provides an annular space surrounding said cable for receiving sealing compound, said cap being provided with an annular ring on the inner face thereof and arranged to extend into the end of said sleeve and serves to compress the sealing compound into contact with the cable and with the inner surfaces of said sleeve.

4. A connecter for an electric cable comprising a sleeve for surrounding said cable and having a screw-thread formed thereon for mounting said sleeve in a threaded socket, a partition wall closing one end of said sleeve and provided with a plurality of conductor apertures formed therein, said partition wall being secured to said sleeve to prevent rotation of said partition with respect to said sleeve, and said apertures being spaced apart whereby when conductors are arranged therein, said conductors lock said sleeve against removal from its socket, said sleeve forming a housing for receiving sealing compound in the space surrounding said cable, and a detachable cap element arranged to close the other end of said sleeve and to retain said sealing compound within said sleeve.

ALBERT J. WAYMAN.